Feb. 16, 1932.　　　F. H. LEWIS　　　1,845,026
ANTISKID CHAIN
Filed May 31, 1930
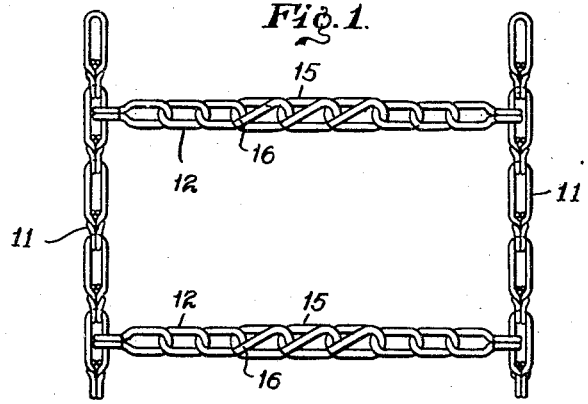
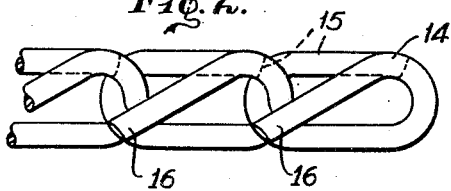
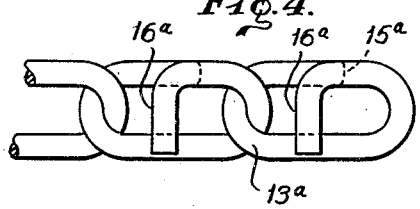
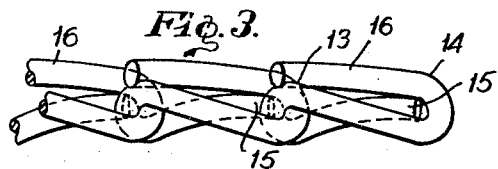
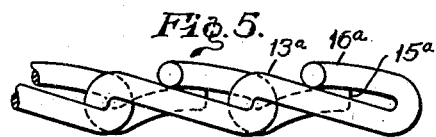
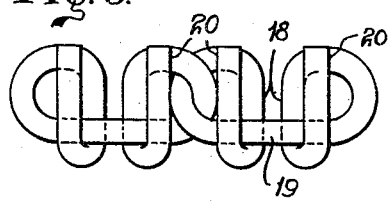
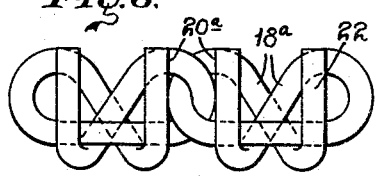
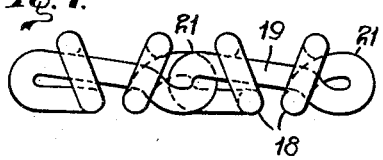
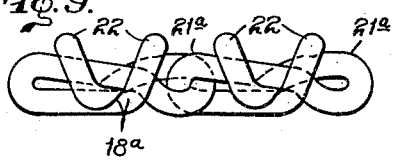
INVENTOR
Fred H. Lewis
By Archworth Martin,
Attorney Patented Feb. 16, 1932

1,845,026

UNITED STATES PATENT OFFICE

FRED H. LEWIS, OF YORK, PENNSYLVANIA, ASSIGNOR, BY MESNE ASSIGNMENTS, TO THE McKAY COMPANY, OF PITTSBURGH, PENNSYLVANIA, A CORPORATION OF PENNSYLVANIA

ANTISKID CHAIN

Application filed May 31, 1930. Serial No. 458,468.

My invention relates to anti-skid chains such as are employed on vehicle wheels, and more particularly to chains of the reinforced or calk type.

One object of my invention is to provide a chain which is better resistant to skidding than various types of chains heretofore employed.

Another object of my invention is to provide a chain which will have a maximum resistance to wear and hence increased life, for a given quantity of material.

Still another object of my invention is to provide a chain of generally improved structure.

Some of the forms which my invention may take are shown in the accompanying drawings, wherein Figure 1 is a fragmentary plan view of a portion of an anti-skid chain; Figs. 2 and 3 are plan and side elevational views respectively of certain of the links of Fig. 1, on an enlarged scale; Figs. 4 and 5 are plan and side elevational views respectively of a modification of the structure of Figs. 2 and 3; Figs. 6 and 7 are plan and side elevational views of another modification, and Figs. 8 and 9 are plan and side elevational views respectively of still another modification.

Referring to Figs. 1 to 3, the numeral 11 indicates side chains or tension members which may be of any well-known form, and the numerals 12 indicate the cross chains or tread chains that extend across the tread of the wheel and function to prevent skidding or slipping of the wheel.

The links of the cross chains 12 are, as usual in structures of this character, each twisted through approximately 90° so that the links of each cross chain will all lie in substantially a given plane instead of each link being normally disposed in a plane at right angles to the plane of the adjacent links as in the case of chains having ordinary straight sided or flat links. The twisting of the links produces bends which form raised portions or protuberances as indicated at 13 and 14, at the ends of the links; and, in the ordinary form of link, the wear is taken almost entirely by these protuberances, which soon become worn through and thereby result in breaking of the cross chains. As hereinafter explained, I increase the life of the cross chains by providing thickened wearing sections on the links at these raised points.

The stock from which the links are formed is bent to substantially the shape shown more clearly in Fig. 2, with one end 15 of the bar stock or wire welded to the body of the link. The other end 16 of the link is extended diagonally across the body of the link and is welded to the bent or raised portion 13 thereof. The extension 16 is at the outer side of the chain and therefore has contact with the roadway.

It will be seen that the portion 13 of the link will not be subjected to wear until the extension 16 thereof has become worn through and that the end portion 15 of the link will not be subjected to wear until the material at 14 has worn completely through. The chain may be continued in use until the portion 13 has become worn to such an extent as to result in breaking of the link. Ordinarily, only a wearing section equal to the thickness of the portion 13 is provided in anti-skid chains. Therefore, by employing only a small additional quantity of metal I am enabled to increase the life of twisted link chains to approximately double that which they would otherwise have.

Referring now to Figs. 4 and 5, I show tread links having extensions 16a which correspond to the extensions 16 of Figs. 2 and 3, but wherein the extensions are disposed at right angles to the longitudinal center line of the link instead of being disposed diagonally thereof, as in Fig. 2. While the extremities of the extensions 16a are not superposed directly upon the bends or protuberance 13a, they are in such proximity thereto and at such height relative thereto, as to relieve the protuberances 13a of considerable wear. The ends 15a of the links likewise terminate at a point further removed from the adjacent end of the link than that at which the ends 15 in Figs. 2 and 3 terminate, but in either case, additional wearing metal is provided with small increase of stock material.

In Figs. 6 and 7, links are shown which are bent to eye form at each end and have straight portions 18 extending beneath the body portion 19 of the link and these portions are bent backward over the outer side of said body portion 19 and are welded at 20 to the eyes of the link. The portions 18 may also be welded to either the inner or the outer sides of the body portion 19 or to both of such sides, if desired. These links are twisted as shown more clearly in Fig. 7 and the bends or protuberances 21 which result from such twists are protected from wear by the back-turned ends of the portions 18.

Figs. 8 and 9 show a modification somewhat similar to Fig. 6, but wherein the portions 18a extend along diagonal lines relative to the longitudinal center line of the link and cross one another at the rear side of the link. The portions 22 of this link are brought up from beneath or behind the body of the link and bent transversely thereof, being preferably welded to the eye portions of the link at the points 20. These portions 22 protect the bends or protuberances 21a of the links from wear, and of course, thereby increase the life of the links.

In all of the structures above-described, the links are twisted preferably after being bent to shape and the cross chains 12 may be composed entirely of these specially-formed links or may contain such links only at their mid portions where the greatest wear occurs.

It will be of course understood that after the cross chain structure is completed as shown in the drawings, it may be subjected to heat-treatment to harden the same.

I claim as my invention:—

1. A chain containing interconnected links each formed of bar stock and having a protuberance at one end where it crosses an adjacent link, one extremity of the bar stock terminating adjacent to one end of the link and the other end of which extends over and past the said extremity into superposed position on said protuberance.

2. A chain containing interconnected links each formed of bar stock and having a protuberance at one end where it crosses an adjacent link, one extremity of the bar stock terminating adjacent to the other end of the link and the other end of the stock overlapping the first-named end and extending to the opposite end of the link in superposed relation to said protuberance.

3. A chain containing interconnected links each formed of bar stock and having a protuberance at one end where it crosses an adjacent link, one extremity of the bar stock terminating adjacent to the other end of the link and the other end of the stock overlapping the first-named end and extending to the opposite end of the link in superposed relation to said protuberance, the said extremity and the protuberance being located at diagonally opposite points.

In testimony whereof I, the said FRED H. LEWIS, have hereunto set my hand.

FRED H. LEWIS.